3 50-276

CROSS REFERENCE
178
1.85

SEARCH ROOM

X 2578

March 28, 1961 R. N. RHODES ET AL 2,977,412

LIGHT REFLECTION REDUCING DEVICE

Filed March 25, 1958

INVENTORS
ROLAND N. RHODES &
FREDERICK H. NICOLL
BY

ATTORNEY

United States Patent Office 2,977,412 Patented Mar. 28, 1961

2,977,412

LIGHT REFLECTION REDUCING DEVICE

Roland N. Rhodes, Levittown, Pa., and Frederick H. Nicoll, Princeton, N.J., assignors to Radio Corporation of America, a corporation of Delaware Filed Mar. 25, 1958, Ser. No. 723,912

2 Claims. (Cl. 178—7.85)

This invention relates to optical devices to improve the quality of the images viewed on the face of a television receiver viewing surface, and more particularly to devices for improving the contrast of the image on the face of a television receiver kinescope under conditions of high ambient light of both diffused and concentrated nature within the viewing area of the receiver which may be reflected from the viewing surface.

When viewing an image on the face of a television receiver kinescope or picture tube, various reflections of the ambient light in the viewing area may be reflected from the viewing surface of the receiver. These reflections are particularly bothersome because of the transparent structure between the phosphor of the kinescope and point from which the image is viewed. The structure includes a safety glass covering the face of the kinescope or picture tube, thus four surfaces of glass are present that may reflect the ambient light. The surfaces that may cause unwanted light reflections are the front and rear surfaces of the faceplate of the kinescope and the front and rear surfaces of the safety glass. Under many circumstances it may be desired to view the image on the television receiver viewing surface under conditions of high ambient light, but the reflections of more or less concentrated light sources from the viewing surface may be such as to cause bright spots, and reflections of diffused light cause lowering of the apparent contrast of the entire image.

It is therefore an object of this invention to provide an improved viewing device to enhance the contrast of the image viewed on the viewing surface of a television receiver.

It is another object of this invention to provide an improved viewing device for reducing the reflection of unwanted light from the viewing surface of a television receiver under conditions of high ambient light levels that may exist in the viewing area.

In accordance with the invention, certain of the surfaces of transparent structure between the light emitting phosphor of the kinescope and the point from which the image of the receiver is viewed, are provided with surfaces having low light reflecting characteristics; and a structure having threads or fibers is positioned between the transparent structure and the point from which the image is viewed.

The invention may be better understood, however, when the following description is read with reference to the accompanying drawing, in which.

Figure 1:
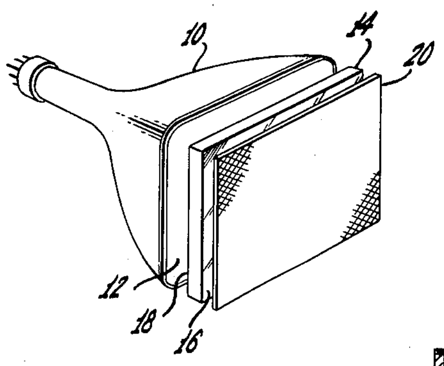
Figure 1 is an exploded view of a television receiver kinescope having a viewing device in accordance with the invention for reducing light reflections.

Referring now to the drawings, and in particular to Figure 1, a kinescope or picture tube 10 has a faceplate 12 upon which the image to be reproduced is displayed. The image is generated in the conventional manner by scanning horizontal lines of light, produced by an electron beam striking a phosphor on the inner surface of the faceplate 12, successively down the surface of the faceplate 12 in a vertical direction. The lines of light are intensity modulated to produce the image. As in conventional receivers, a safety glass 14 is provided covering the faceplate 12 of the kinescope 10. The safety glass 14 is provided to prevent particles of glass from being projected toward the viewing area adjacent the receiver if an implosion of kinescope 10 occurs. Under conditions of high ambient light levels, however, a viewing device utilizing only a kinescope faceplate and safety glass may be difficult to view, since light will be reflected from the front and rear surfaces of the safety glass 14 and also from the front and rear surfaces the faceplate 12 of the kinescope 10.

In accordance with the invention, the front surface 16 and the rear surface 18 of the safety glass 14 have low light reflecting properties. The low light reflecting properties may be formed on the surfaces 16 and 18 by any one of a number of well known methods. One method for forming a low reflecting surface on glass is disclosed and claimed in Patent 2,461,840 to Nicoll, issued February 15, 1949. Further in accordance with the invention, a structure having threads or fibers such as a mesh 20, as shown in Figure 1, is placed over the treated surface 16 of the safety glass 14 with the interwoven threads 21 of the mesh oriented at angles with respect to the horizontal scanning lines of the image on the viewing surface 12 of the kinescope 10.

It will be appreciated, of course, that the low reflecting surfaces 16 and 18 of the safety glass 14, alone, would reduce reflections of ambient light from the face of the kinescope and provide an increase in contrast of the image being viewed. However, most methods of reducing reflection from glass forms a surface that is easily damaged as by touching or scratching the surface. See, for instance, in this regard column 7, lines 46 to 55, of the aforementioned patent to Nicoll, No. 2,461,840. It has thus far not proved commercially practicable to use low light reflecting surfaces for the safety glass in commercial television receivers. The mesh 20, in addition to the other uses to be described hereinafter, serves also to protect the low light reflecting surface 16 of the safety glass 14 from physical damage of a character to render it ineffective to reduce reflections.

The low light reflecting surfaces 16 and 18 of the safety glass 14 may be made to provide reduced reflections from various discrete directions of light striking the surface 16. However, for use with a television receiver the low light reflecting surfaces 16 and 18 should reflect the smallest amount of light when the ambient light strikes the surfaces at the normal. Thus, as the angle of light incidence varies from the normal more light will be reflected. At the sides of the viewing area, that is, at angles differing substantially from the normal, the reflections of the ambient light will not be reduced appreciably by the low reflecting surfaces 16 and 18.

The thread structure of the mesh 20 provides reduction of light reflections for light that is incident upon the viewing device at angles that deviate appreciably from the normal. The mesh 20 comprises threads 21 of material woven at right angles and for best operation should be of a dark colored material. The material of the threads of the mesh may be metallic or fabric. For instance, the mesh 20 may be a material of sheer rayon or nylon having approximately 100 threads to the inch which will give approximately 50% light transmission for light incident on the mesh at the normal, decreasing as the angle deviates from the normal. Because of its mesh structure when such a material is placed over the outermost surface 16 of the faceplate 14 it will substantially reduce the amount of light that is allowed to strike the surface 16 of the faceplate 14 that approaches the viewing surface from an angle that differs substantially from the normal. Light transmission through the mesh from the kinescope at the normal will, of course, be reduced by the amount that the material will not transmit light, in the example given approximately 50%. Light from the viewing area that may cause reflections is further reduced for it must pass twice through the mesh, once to strike the viewing device and twice when it is reflected from the viewing device to the viewing area.

Figure 3:
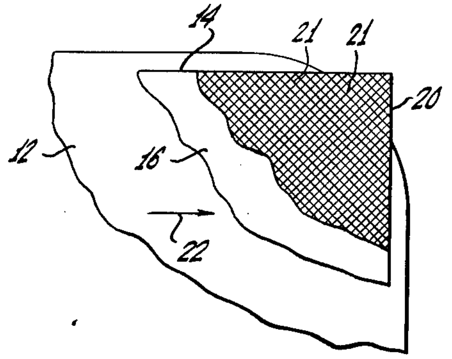
Figure 3 is a detailed drawing of a portion of the structures shown in Figures 1 and 2.

The threads 21 of the material of the mesh 20 are oriented at angles to the scanning lines of the television receiver. This structure is illustrated in Figure 3 which shows a portion of the faceplate 12 of the kinescope 10 over which is superimposed the safety glass 14 and the mesh 20. The arrow 22 indicates the direction of the scanning lines on the faceplate 12 of the kinescope and the threads 21 of the mesh 20 are oriented at angles of 45 degrees with respect to the horizontal scanning lines to substantially eliminate moire effects between the threads 21 and the horizontal scanning lines.

Figure 2:
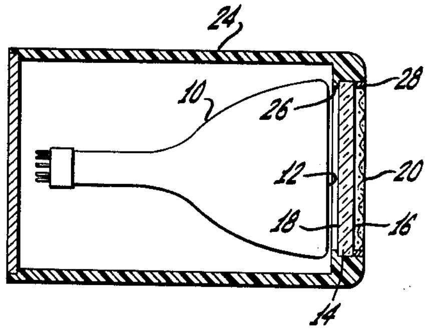
Figure 2 is a diagram of a television receiver cabinet and kinescope having a viewing device in accordance with the invention for reducing light reflections.

Referring to Figure 2, there is illustrated one manner in which the improved viewing device may be mounted in a television receiver in conjunction with the kinescope 10. The kinescope 10 may be held in position by brackets (not shown) in a cabinet 24 which has an opening or aperture 26 in the front wall of the cabinet 24. The faceplate 12 of the kinescope 10 is placed so that it may be viewed through the opening 26. The safety glass 14 is also placed across the opening so that the face of the kinescope must be viewed therethrough. The mesh 20 is fixed on a frame 28 which is also mounted within the opening 26 in the front wall of the television receiver cabinet 24. Thus, the image on the face 12 of the kinescope 10 must be viewed through a viewing device comprising the safety glass 14, both of whose surfaces 16 and 18 are low light reflecting surfaces, and the mesh 20. The complementary directivity of the low light reflecting properties of the two materials, that is, the safety glass surfaces from the normal and the mesh surface at large angles to the normal, will substantially eliminate reflections from the viewing device due to ambient light within the viewing area striking the viewing device.

Figure 4:
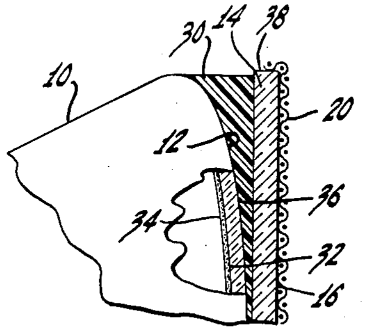
Figure 4 is a sectional view of a portion of a kinescope having a viewing device for reducing light reflections and illustrating another embodiment of the invention.

Referring now to Figure 4, another embodiment of the invention for reducing light reflection from the viewing device of a television receiver again includes a safety glass 14 positioned in front of the faceplate 12 of a kinescope 10. In this embodiment, however, the safety glass 14 is cemented to the faceplate 12 of the kinescope by optical cement 30, such as Canada balsam natural resin which has been used to cement optical lenses together. Since ordinary optical cement may have the same refractive index as the glass in the faceplate 12 and the safety glass 14, no reflections will exist at the boundaries between the safety glass 14, the cement 30, and the faceplate 12 of the kinescope 10. Thus, only two surfaces will reflect light, the outer or front surface 16 of the safety glass 14 and the inner surface 32 of the kinescope faceplate 12. In order to most completely eliminate reflections, both the inner surface 32 of the kinescope face 12 and the outer surface 16 of the safety glass 14 should be treated to provide a low light reflectivity. However, excellent results can be obtained by treating only the outer or front surface 16 of the safety glass 14. The inner surface 32 of the kinescope faceplate 12 is partially covered by the phosphor layer 34 of the kinescope 10 which serves to partially reduce reflections from the inner surface 32. To complete the device the mesh 20 is positioned over the outer surface 16 of the safety glass 14 and in contact therewith. The mesh 20 may be secured by simply gluing it to the edges 36 of the safety glass 14. It will be appreciated, of course, that any other material having a refractive index equal to that of the glass of the kinescope face 12 and the safety glass 14 may be used in the place of the optical cement 30. As an example, an oil film may be used if the index refraction of the oil is substantially the same as that of the glass being used.

Figure 5:
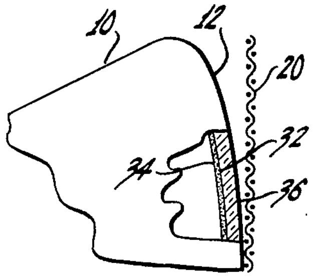
Figure 5 is a sectional view of a portion of a kinescope having a light reflection reducing viewing device illustrating a further embodiment of the invention.

The same reflecting benefits may be obtained by treating the surfaces of the kinescope faceplate 12 to have low light reflecting characteristics and by placing the mesh 20 merely over the kinescope faceplate 12. This structure is illustrated in Figure 5, wherein both the inner surface 32 and the outer surface 36 of the kinescope faceplate 12 are treated to have low light reflecting characteristics. Of course only the outer surface 36 may be treated, with some loss in reflection reduction. If then the mesh 20 is positioned in front of the faceplate 12, reflections therefrom will be substantially reduced. From a safety standpoint it is desirable that the mesh be of a more rugged material than nylon or rayon and a blackened anodized aluminum, blackened stainless steel, or other relatively strong mesh may be used.

It will be noted that the threads of the mesh 20 may be in contact with the surface from which reflections are to be reduced, such as in contact with the safety glass 14 as shown in Figure 4; or the mesh 20 may be spaced away from the surface by a small amount such as shown in Figure 2. Spacings of ⅛ of an inch have proved satisfactory, although greater spacings may be used.

A viewing device for reducing the reflections which otherwise would result from ambient light in the image viewing area of a television receiver constructed in accordance with the invention is characterized by its ability to effect a substantial reduction of reflected light through a relatively wide angle whereby to increase the image contrast and by its simplicity and ruggedness of construction to withstand the wear and tear that may be experienced by a television receiver.

We claim:

1. A viewing device for reducing light reflections from the transparent structure located between the phosphor screen of a kinescope and an image observation point to enhance the contrast of an image displayed on said screen, wherein an image is generated on said screen by intensity modulating horizontal scanning light lines successively displayed on said screen, and wherein said transparent structure includes a transparent element having two surfaces, said device comprising in combination, means providing low light reflectivity from at least one surface of said transparent element with a reflection directivity characteristic wherein the least light reflection therefrom is for light striking the viewing device at substantially the normal thereto, and means including a woven mesh structure interposed in the light path between said transparent element and the point from which the image is viewed having threads therein at angles to each other, said mesh structure positioned so that the threads thereof are at an angle to said horizontal scanning light lines to reduce reflections from the viewing surface for light incident thereon at angles differing substantially from the normal.

2. A light reflection reducing device for reducing light reflections from the transparent structure located between the phosphor screen of a kinescope in a television receiver and an image observation point to enhance the contrast of an image displayed on said phosphor screen, wherein an image is generated on said screen by intensity modulating horizontal scanning light lines successively displayed on said screen, and wherein said transparent structure includes a transparent element having two surfaces interposed between said screen and the point from which the image is viewed, said device comprising in combination means providing low light reflectivity on the surfaces of said transparent element having the least light reflection therefrom for light striking said surfaces at substantially the normal thereto, and means including a mesh structure positioned over said transparent element having threads therein at right angles with each other, said mesh positioned so that the threads thereof are at 45 degree angles to said horizontal scanning light lines to reduce reflections from the surfaces of said element for light incident on said light reflection reducing device at angles differing substantially from the normal.

References Cited in the file of this patent

UNITED STATES PATENTS

| | | |
|---|---|---|
| 2,655,452 | Barnes et al. | Oct. 13, 1953 |

FOREIGN PATENTS

| | | |
|---|---|---|
| 188,751 | Great Britain | Nov. 13, 1922 |
| 675,925 | Great Britain | July 16, 1952 |
| 706,190 | Great Britain | Mar. 24, 1954 |